United States Patent
Kwon et al.

(10) Patent No.: US 7,667,775 B2
(45) Date of Patent: Feb. 23, 2010

(54) DIGITAL CABLE TV RECEIVER, DIAGNOSTIC METHOD FOR THE DIGITAL CABLE TV RECEIVER, AND DATA STRUCTURE OF DVI STATUS REPORT

(75) Inventors: Kwang Hun Kwon, Seoul (KR); Sang Hoon Cha, Seoul (KR)

(73) Assignee: LG Electronics Inc., Seoul (KR)

( * ) Notice: Subject to any disclaimer, the term of this patent is extended or adjusted under 35 U.S.C. 154(b) by 1044 days.

(21) Appl. No.: 11/178,314

(22) Filed: Jul. 12, 2005

(65) Prior Publication Data

US 2006/0026651 A1 Feb. 2, 2006

(30) Foreign Application Priority Data

Jul. 30, 2004 (KR) ............... 10-2004-0060360

(51) Int. Cl.
*H04N 7/00* (2006.01)

(52) U.S. Cl. .................................... 348/553

(58) Field of Classification Search ............. 348/552, 348/553; 725/61, 112, 86; 340/825.22
See application file for complete search history.

(56) References Cited

U.S. PATENT DOCUMENTS

| | | | |
|---|---|---|---|
| 5,883,621 A | 3/1999 | Iwamura | |
| 6,278,455 B1 | 8/2001 | Baker | |
| 6,448,987 B1 | 9/2002 | Easty et al. | |
| 6,559,872 B1 | 5/2003 | Lehikoinen et al. | |
| 6,577,303 B2 * | 6/2003 | Kim | 345/212 |
| 6,839,055 B1 | 1/2005 | Nguyen | |
| 7,135,985 B2 * | 11/2006 | Woolgar et al. | 340/825.22 |
| 7,248,597 B2 | 7/2007 | Kim | |
| 7,457,857 B1 | 11/2008 | Crayford et al. | |
| 7,486,337 B2 * | 2/2009 | Bian | 348/589 |
| 2001/0028367 A1 | 10/2001 | Saitoh et al. | |
| 2001/0030959 A1 | 10/2001 | Ozawa et al. | |
| 2002/0060676 A1 | 5/2002 | Kim | |
| 2002/0075333 A1 | 6/2002 | Dutta et al. | |
| 2002/0196266 A1 | 12/2002 | Mou et al. | |
| 2003/0009542 A1 * | 1/2003 | Kasal et al. | 709/222 |
| 2003/0137934 A1 | 7/2003 | Schaller et al. | |
| 2004/0031058 A1 * | 2/2004 | Reisman | 725/112 |
| 2004/0143847 A1 * | 7/2004 | Suzuki et al. | 725/61 |
| 2005/0204163 A1 * | 9/2005 | Alkove et al. | 713/201 |
| 2006/0031895 A1 * | 2/2006 | Kwon et al. | 725/100 |
| 2007/0044135 A1 * | 2/2007 | Kwon et al. | 725/133 |
| 2007/0206122 A1 | 9/2007 | Dickens et al. | |

OTHER PUBLICATIONS

Society of Cable Telecommunications Engineers: "HOST-POD interface standard" [Online] 2003, pp. 1-235, XP002408006.
Digital Visual Interface DVI, Revision No. 1.0, Apr. 2, 1999 , pp. 1-76, XP002907715.
High-Bandwidth Digital Content Protection System, Revision No. 1.091, Apr. 22, 2003, pp. 1-78, XP002309501.

* cited by examiner

*Primary Examiner*—Paulos M Natnael
(74) *Attorney, Agent, or Firm*—McKenna Long & Aldridge LLP

(57) ABSTRACT

A digital cable TV receiver includes a POD module and a host device. The host device includes a DVI controller and a plurality of DVI ports linked to a plurality of peripheral devices, respectively. When the DVI controller receives a diagnostic request for DVI status from the POD module, it generates a DVI status report and transmits the DVI status report to the POD module. The DVI status report includes a plurality of DVI status information associated with the plurality of peripheral devices, respectively.

14 Claims, 6 Drawing Sheets

FIG. 1
RELATED ART
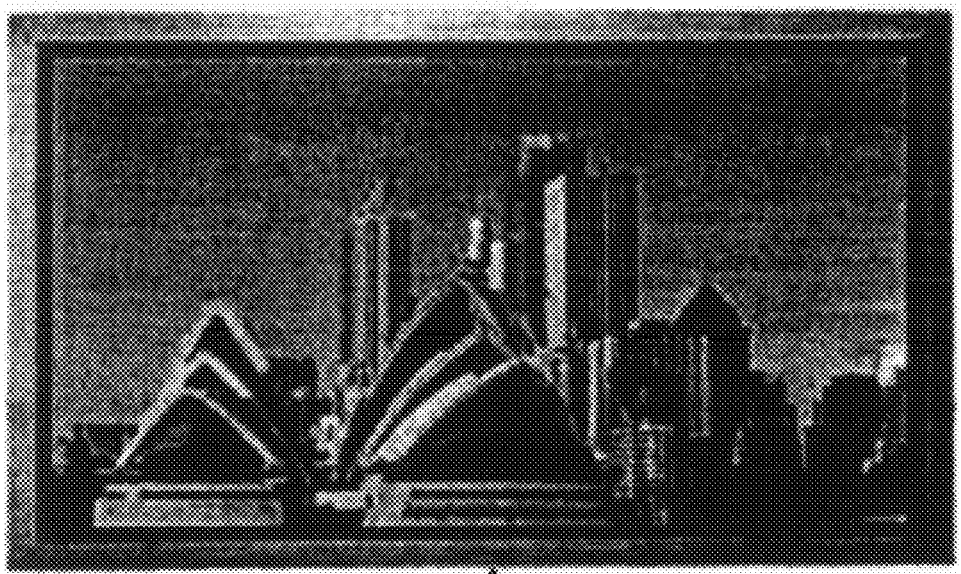
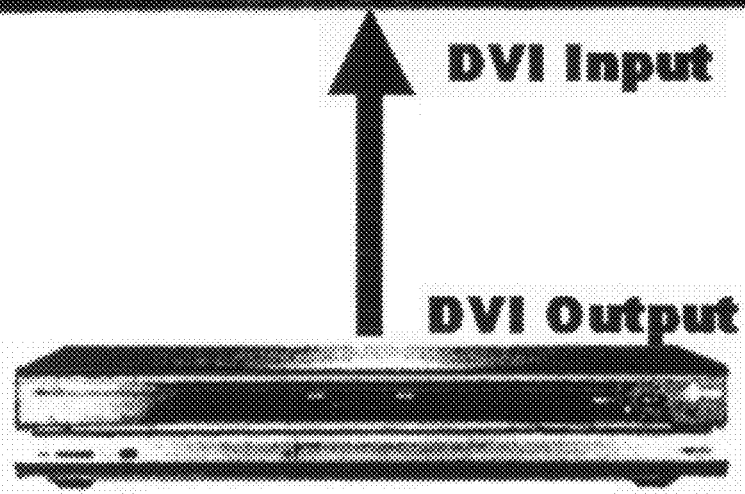

FIG. 5

| Syntax | # of bits | Mnemonic |
|---|---|---|
| DVI_status_report(){ | | |
|   reserved | 3 | |
|   connection_status | 2 | Bslbf |
|   if (connection_status !=0x00){ | | |
|     connection_count | 8 | Uimsbf |
|     for(i=0; i<connection_count; i++){ | | |
|       reserved | 3 | |
|       connection_no | 8 | Uimsbf |
|       connection_type | 2 | Bslbf |
|       host_HDCP_status | 1 | Bslbf |
|       device_HDCP_status | 2 | Bslbf |
|       video_format | | |
|       { | | |
|         horizontal_lines | 16 | Uimsbf |
|         vertical_lines | 16 | Uimsbf |
|         scan_rate | 8 | Uimsbf |
|         aspect_ratio | 2 | Bslbf |
|         prog_inter_type | 1 | Bslbf |
|         Reserved | 5 | |
|       } | | |
|     } | | |
|   } | | |
| } | | |

DIGITAL CABLE TV RECEIVER, DIAGNOSTIC METHOD FOR THE DIGITAL CABLE TV RECEIVER, AND DATA STRUCTURE OF DVI STATUS REPORT

This application claims the benefit of the Korean Patent Application No. 10-2004-0060360, filed on Jul. 30, 2004, which is hereby incorporated by reference as if fully set forth herein.

BACKGROUND OF THE INVENTION

1. Field of the Invention

The present invention relates to a cable broadcast program receiver and transmitter, and more particularly, to a digital cable TV receiver, a diagnostic method for the digital cable TV receiver, and a data structure of a DVI status report.

2. Discussion of the Related Art

Generally, a Digital Visual Interface (DVI) is a transmission standard established by a consortium called the Digital Display Working Group (DDWG), which has been created by a group of leaders in the computer industry. The DVI is used to digitally connect a personal computer (PC) to a flat monitor. More specifically, the DVI is a standard for digitally connecting signals exchanged between the PC and the monitor. The DVI has mainly been adopted to peripheral devices that are used by being connected to a PC, such as personal computers, office projectors, general plasma displays, electric boards. And, recently, the DVI has also been adopted in digital television (TV) receivers and cable digital television (TV) receivers. Before the DVI standard was developed, digital signals were exchanged by a complicated process. First, the PC creates digital data. Then, even though the digital display device is capable of receiving digital data, the digital data transmitted from the PC is converted to analog data, which is converted back to digital data and then transmitted to the digital display device. Therefore, in order to avoid such a complicated process, the DVI standard has been developed to allow the digital data created from the PC to be digitally transmitted directly to the display device through a cable. In the DVI standard, digital broadcast signals that are not compressed are transmitted in a single direction.

Meanwhile, a cable broadcast system broadly includes a cable broadcast station and a cable broadcast program receiver (or digital cable TV receiver). Herein, the cable broadcast station transmits cable broadcast programs, and the cable broadcast program receiver receives the transmitted cable broadcast program. The cable broadcast station may be referred to as a SO head-end or a MSO head-end. The SO refers to a System Operator (SO) (i.e., the Local Cable TV System Operator), and the MSO refers to a Multiple System Operator (MSO), which is a group of SO.

Moreover, the cable broadcast program receiver adopts an open cable, wherein a Point of Deployment (POD) module including a Conditional Access (CA) system is separated (or detached) from the main body. For example, the POD module uses a Personal Computer Memory Card International Association (PCMCIA) card which can be mounted onto and separated from a main body slot of the cable broadcast program receiver. Therefore, the POD module may also be referred to as a cable card, and the main body, wherein the POD module is inserted, may also be referred to as a host. In other words, a combination of the POD module and the main body is referred to as the cable broadcast program receiver. Herein, the host may be connected to other peripheral devices (e.g., a DVD player, a digital camera/camcorder, a set-top box, etc.) through a DVI link. And, as shown in FIG. 1 to FIG. 3, at least one or more peripheral devices may be connected. More specifically, when at least one DVI terminal/port (or a plurality of DVI terminals/ports) is provided by the host, at least one peripheral device (or a plurality of peripheral devices) may be simultaneously connected to the host.

Referring to FIG. 1 to FIG. 3, one of a Digital Built-in TV and a Digital Ready TV corresponds to the host. FIG. 1 illustrates an example of the host being connected to a peripheral device through a single DVI link. More specifically, an Output port of a set-top box (or a DVD Player) is connected to a DVI Input port of the host. FIG. 2 illustrates an example of the host being connected to a plurality of peripheral devices through a plurality of DVI links, wherein a plurality of DVI Input ports is provided by the host. Referring to FIG. 2, a DVI Output port of the Set Top box is connected to a first DVI Input port of the host, and, simultaneously, a DVI Output port of a DVD Player is connected to a second DVI Input port of the host. Finally, FIG. 3 illustrates an example of both DVI Input/Output ports being provided in a random peripheral device. More specifically, both DVI Input/Output ports are provided in a Set Top box. Referring to FIG. 3, the DVI Output port of the Set Top box is connected to the DVI Input port of the host, and the DVI Output port of a DVD Player (or another peripheral device) is connected to the Input port of the Set Top box.

Meanwhile, in an open cable standard, wherein the POD module is separated from the main body, as described above, the host has a diagnostic function that can monitor each status of the host. For example, in Host-POD interface standard, a Generic Diagnostic Protocol is defined in a host-POD resource layer. More specifically, when the host receives a request for verifying and reporting the DVI status from the POD module through the Generic Diagnostic Protocol, the host verifies the DVI status and creates a syntax (DVI Status Report Syntax) so as to report the verified DVI status to the POD module.

However, according to the DVI Status Report Syntax, when a plurality of peripheral devices is simultaneously connected to the host through the DVI port, as shown in FIG. 2 and FIG. 3, only the DVI link status information for one port can be transmitted to the POD module, and the DVI link status information for the remaining ports cannot be transmitted to the POD module. Furthermore, when DVI Input/Output ports both exist within a peripheral device and when the host and another peripheral device is connected to the corresponding Input/Output ports, as shown in FIG. 3, only the DVI link status information for one port can be transmitted to the POD module, and the DVI link status information for the remaining ports cannot be transmitted to the POD module.

SUMMARY OF THE INVENTION

Accordingly, the present invention is directed to a digital cable TV receiver, a diagnostic method for the digital cable TV receiver, and a data structure of a DVI status report that substantially obviate one or more problems due to limitations and disadvantages of the related art.

An object of the present invention is to provide a digital cable TV receiver, a diagnostic method for the digital cable TV receiver, and a data structure of a DVI status report that can transmit status information of all of a plurality of DVI Input/Output ports to a POD module, when DVI link exists between a host and a plurality of peripheral devices from an open cable type digital cable TV receiver, wherein the POD module is separated from the host.

Another object of the present invention is to provide a digital cable TV receiver, a diagnostic method for the digital cable TV receiver, and a data structure of a DVI status report that can transmit all status type information to the POD even when a plurality of peripheral devices is simultaneously connected to the host through DVI ports by using a DVI Status Report Syntax within a Generic Diagnostic Protocol.

A further object of the present invention is to provide a digital cable TV receiver, a diagnostic method for the digital cable TV receiver, and a data structure of a DVI status report that can transmit information to a POD module as to whether the DVI port of the host having peripheral devices connected thereto is a DVI Input port, a DVI Output port, or a DVI Input/Output port.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital cable TV receiver includes a POD module, and a host device comprising a DVI controller and a plurality of DVI ports linked to a plurality of peripheral devices, respectively, wherein the DVI controller generates a DVI status report and transmits the DVI status report to the POD module when a diagnostic request for a DVI status is received from the POD module, wherein the DVI status report comprises a plurality of DVI status information associated with the plurality of peripheral devices, respectively.

In another aspect of the present invention, a diagnostic method for a digital cable TV receiver having a plurality of DVI ports includes receiving a diagnostic request for a DVI status from a POD module, and performing a diagnostic function in response to the diagnostic request by generating a DVI status report and transmitting the DVI status report to the POD module, the DVI status report comprising a plurality of DVI status information associated with a plurality of peripheral devices which are linked to the plurality of DVI ports, respectively.

In a further aspect of the present invention, a data structure of a DVI status report for use in a digital cable TV receiver includes a connection count field indicating a number of a plurality of DVI ports linked to a plurality of peripheral devices, respectively, and a plurality of DVI status information associated with the plurality of peripheral devices, respectively.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a general example of a peripheral device being connected to a cable broadcast program receiver (or digital cable TV receiver) by a single DVI link;

FIG. 5 illustrates an example of an expanded DVI Status Report Syntax according to the present invention;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts. In addition, although the terms used in the present invention are selected from generally known and used terms, some of the terms mentioned in the description of the present invention have been selected by the applicant at his or her discretion, the detailed meanings of which are described in relevant parts of the description herein. Furthermore, it is required that the present invention is understood, not simply by the actual terms used but by the meaning of each term lying within.

The present invention relates to transmitting all status information to a POD module, when a plurality of peripheral devices are connected to a host by DVI link in an open cable type digital cable TV receiver, wherein the POD module is separated from the host. Most particularly, the present invention relates to transmitting all status information to a POD module by expanding a DVI Status Report Syntax within a Generic Diagnostic Protocol, when a plurality of peripheral devices are simultaneously connected to the host by DVI link.

In other words, wherein the POD module is separated from the main body, a diagnostic function is provided to allow each status of the host to be monitored. The diagnostic function checks various statuses, such as operation status of the host and connection status of the peripheral devices. The Generic Diagnostic Protocol is defined to enable each status information of the host to be monitored in real-time through local broadcast stations (local, user) or cable broadcast stations (remote, MSO head-end). Herein, the Generic Diagnotic Protocol defines the following diagnostics shown in Table 1 below:

TABLE 1

| Diagnostic ID | Diagnostic |
| --- | --- |
| 00 | Set-Top memory allocation |
| 01 | Software version |
| 02 | Firmware version |
| 03 | MAC status |
| 04 | FAT status |
| 05 | FDC status |
| 06 | Current Channel Report |
| 07 | 1394 Port |

TABLE 1-continued

| Diagnostic ID | Diagnostic |
|---|---|
| 08 | DVI status |
| 09~FF | Reserved for future use |

More specifically, when a request for diagnostic is transmitted to the host from the POD module, and when the Diagnostic ID is '08', the details of the request consist of verifying the DVI status of the host and reporting the verified DVI status to the POD module.

Figure 4:
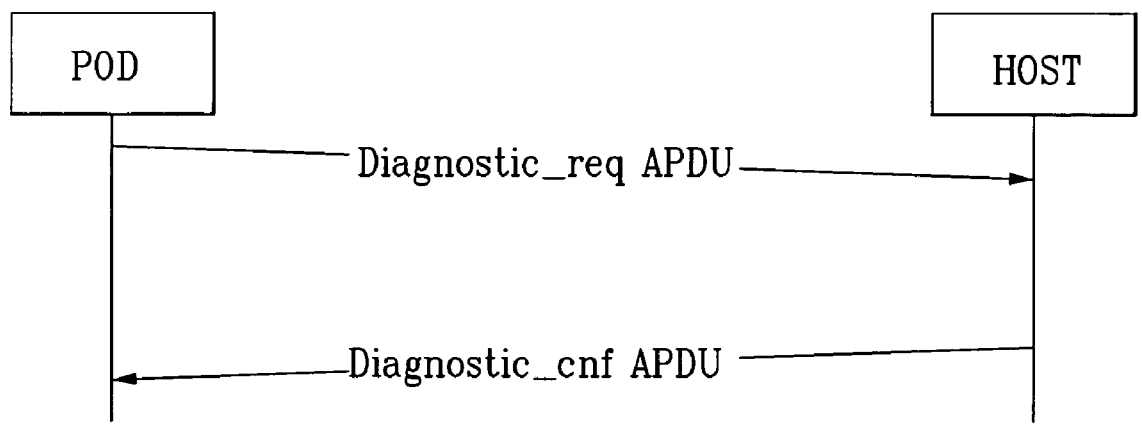
FIG. 4 illustrates an example of a message exchange protocol from a Generic Diagnostic according to the present invention.

FIG. 4 illustrates an example of a message exchange protocol from a Generic Diagnostic according to the present invention. In this example, the POD module transmits a diagnostic request (Diagnostic_req APDU) to the host, and the host transmits the diagnostic result (Diagnostic_cnf APDU) to the POD module. More specifically, when the POD module receives a diagnostic command, the POD module transmits a diagnostic request (Diagnostic_req APDU) to the host. Herein, the diagnostic request may be transmitted to the POD module from the cable broadcast station, or may be inputted directly to the POD module by a user using a remote controller. Alternatively, even when a diagnostic request is not transmitted from the POD module, the system status may be regularly (or periodically) verified from the host, and the corresponding results may be transmitted to the POD module.

For example, under the assumption that a cable broadcast program is not displayed normally, and if a diagnostic command option is provided, which can be selected by a user through a remote controller or a menu screen, the user may be able to select the diagnostic command option by using the remote controller or the menu screen. If the user is in an environment in which he/she is unable to select the diagnostic command directly, the user would contact the cable broadcast station by phone or the Internet. Thereafter, the cable broadcast station will transmit a diagnostic command to the POD module of the corresponding digital cable TV receiver.

Meanwhile, the host receiving the diagnostic request (Diagnostic_req APDU) from the POD module verifies the status of each diagnostic item corresponding to the Diagnostic ID. Then, the host reports the verified results (Diagnostic_cnf APDU) to the POD module. The POD module may either transmit the verified results (Diagnostic_cnf APDU) received from the host to the cable broadcast station or may display the verified results (Diagnostic_cnf APDU) to the user through an OSD Diagnostic application of the host. For example, if a bi-directional transmission can be performed between the cable broadcast station and the digital cable TV receiver, the diagnostic results are transmitted to the cable broadcast station through OOB. At this point, the diagnostic result may be simultaneously transmitted to the cable broadcast station and displayed on the TV screen through the OSD Diagnostic application.

In case the digital cable TV receiver is uni-directional, the diagnostic result is displayed onto the TV screen through the OSD Diagnostic application. And, when the user notifies the cable broadcast station of the displayed contents, the cable broadcast station performs operations in accordance with the diagnostic results (e.g., door-to-door or wireless/wired afterservices). In the present invention, the Generic Diagnostic Protocol is expanded so that status information for all of the peripheral devices connected to the host by DVI link is transmitted to the host, when a Diagnostic ID requiring the DVI status to be verified (i.e., 0x8) is included in the diagnostic request (Diagnostic_req APDU). More specifically, among the Generic Diagnostic Protocol, the DVI Status Report Syntax for reporting the DVI status to the POD module is expanded in the present invention.

FIG. 5 illustrates an example of an expanded DVI Status Report Syntax according to the present invention. Herein, a connection_count field, a connection_no field, and a connection_type field are newly defined, and a repetition statement consisting of a FOR loop is newly included. Referring to FIG. 5, a connection_status field indicates whether a connection exists on the DVI port. For example, when the connection_status field value is '$00_2$', then DVI connection does not exist. The connection_count field is allocated with 8 bits and indicates the number of DVI links, when peripheral devices are connected to the host by DVI link. In other words, the connection_count field is included in the statement when the connection_status field value is not equal to '0'. For example, in case of the examples shown in FIG. 2 and FIG. 3, the connection_count field value is '2'.

Figure 2:
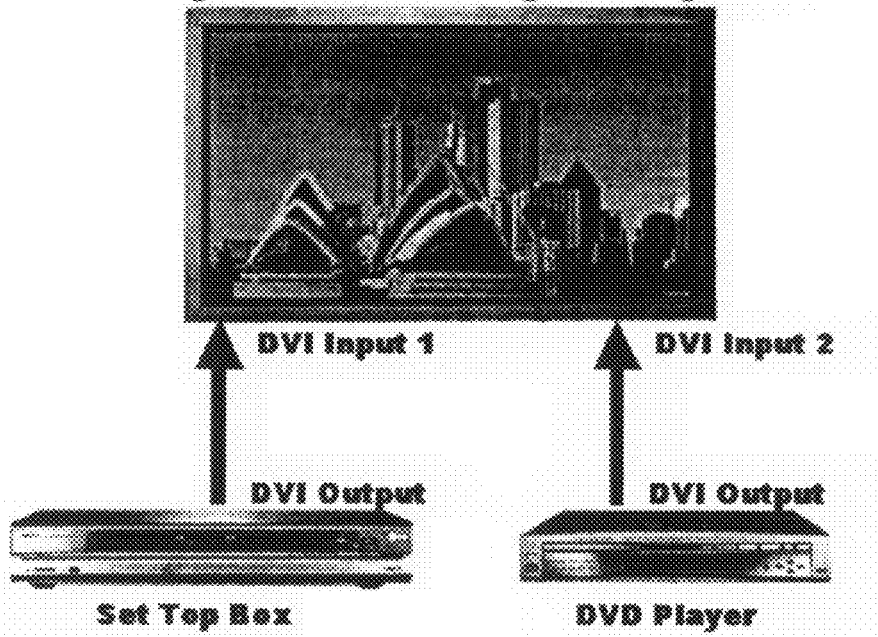
FIG. 2 illustrates a general example of a plurality of peripheral devices being connected to the cable broadcast program receiver (or digital cable TV receiver) by a plurality of DVI links.
Figure 3:
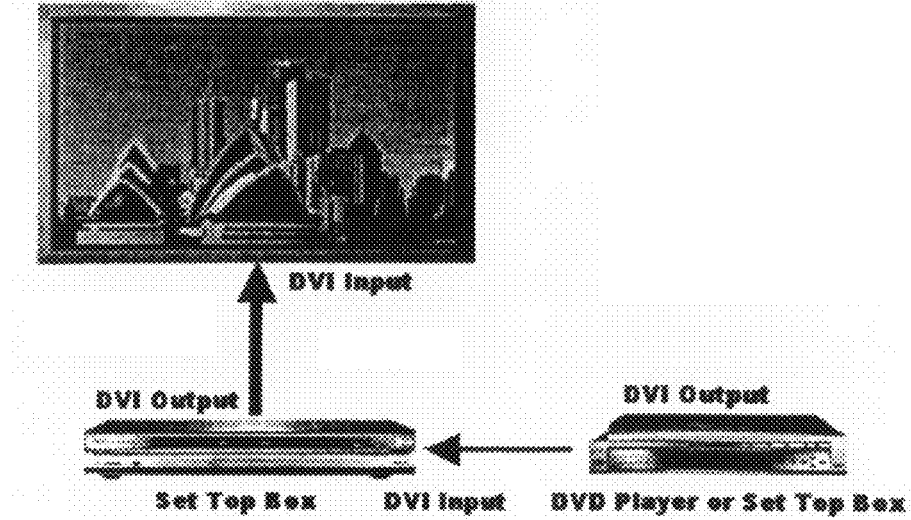
FIG. 3 illustrates general example of a DVI-linked connection, when a DVI Input/Output port exists within the peripheral device connected to the cable broadcast program receiver (or digital cable TV receiver) by a DVI link.

The FOR repetition statement is used for transmitting the status information of all peripheral devices to the POD module, when a plurality of peripheral devices is connected to the host by DVI link. The number of repetitions of the FOR loop is equal to the number of peripheral devices connected to the host by DVI link (i.e., the connection_count field value). For example, when two peripheral devices are connected to the host by DVI link (as shown in FIG. 2), or when one peripheral device is connected to the host by DVI link and another peripheral device is connected to the first device by DVI link (as shown in FIG. 3), the FOR loop is repeated twice. More specifically, each time the FOR loop is performed, the status information for one DVI link is transmitted to the POD module. And, when the FOR loop is repeated twice, the status information for the plurality of peripheral devices is transmitted to the POD module.

The connection_no field is allocated with 8 bits and is located within the FOR repetition statement. The connection_no field is defined to indicate an index of the DVI link status information that is currently being transmitted. For example, when two DVI Input ports are provided in the host, and when it is assumed that a peripheral device is connected to each of the DVI Input ports, the connection_no field indicates whether the DVI link status information that is currently being transmitted is the status information of the first DVI Input port or the status information of the second DVI Input port. The connection_type field is allocated with 2 bits and is also located within the FOR repetition statement. The connection_type field indicates the connection type between the corresponding peripheral device and the host for each DVI link. In other words, the connection_type field indicates whether the DVI port of the host connected to the corresponding peripheral device is a DVI Input port, a DVI Output port or a DVI Input/Output port.

In the shown example, a connection type is defined in accordance with the connection_field type value. More specifically, '$00_2$' indicates the DVI Input port (i.e., an input connection only), '$01_2$' represents the DVI Output port (i.e., an output connection only), and '$10_2$' indicates the DVI Input/Output port (i.e., an input/output connection). Furthermore, '$11_2$' represents an unused (or reserved) status. In the example shown in FIG. 1, the connection_type field value is '$00_2$'. In other words, a DVI Input port is formed in the host, and a peripheral device is connected to the DVI Input port. The value assigned to the DVI port is only a preferred embodiment of the present invention, and the values may vary in accordance with the system designer's (or author's) preference.

Other fields included in the FOR loop are the fields allocated within the conventional DVI Status Report Syntax.

Such fields include a host_HDCP_status field, a Device_HDCP_status field, a video_format field, a horizontal_lines field, a vertical_lines field, a scan_rate field, an aspect_ratio field, and a prog_inter_type field. More specifically, the host_HDCP_status field indicates whether an HDCP is enabled within the DVI link. (Herein, 'HDCP' stands for a High-bandwidth Digital Content Protection standard.) For example, when the host_HDCP_status field value is '$00_2$', the HDCP is not enabled. The Device_HDCP_status field indicates the HDCP status of the peripheral device connected to the host through the DVI port.

The video_format field indicates the current video format used on the DVI port. The horizontal_lines field indicates the number of horizontal lines associated with the video format on the DVI link, and the vertical_lines field indicates the number of vertical lines associated with the video format on the DVI link. The scan_rate field indicates the scan rate associated with the video format on the DVI link, and the aspect_ratio field indicates the aspect ratio associated with the video format on the DVI link. Finally, the prog_inter_type field indicates whether the video is either progressive or interlaced on the DVI link.

Referring to FIG. 5, when the POD module transmits a diagnostic request (Diagnostic_req_APDU) to the host requesting the host to verify and report the DVI status, the host checks the DVI status and transmits the result (Diagnostic_cnf_APDU) to the POD module in a DVI Status Report Syntax form shown in FIG. 5. More specifically, in the connection_status field, the field value indicates whether a DVI link exists. And, when the connection_status field is not '0', i.e., when at least one DVI link exists, the number of DVI links is indicated in the connection_status field. Subsequently, the FOR loop is repeated as much as the number of DVI links indicated in the connection_status field. Each time the FOR loop is performed, a status information for each corresponding DVI link is created. In other words, a connection_no field, a connection_type field, a host_HDCP_status field, a Device_HDCP_status field, and a video format information for each DVI link are created. Herein, the video format information includes horizontal_lines information, vertical_lines information, scan_rate information, aspect_ratio information, and prog_inter_type information.

Figure 6:
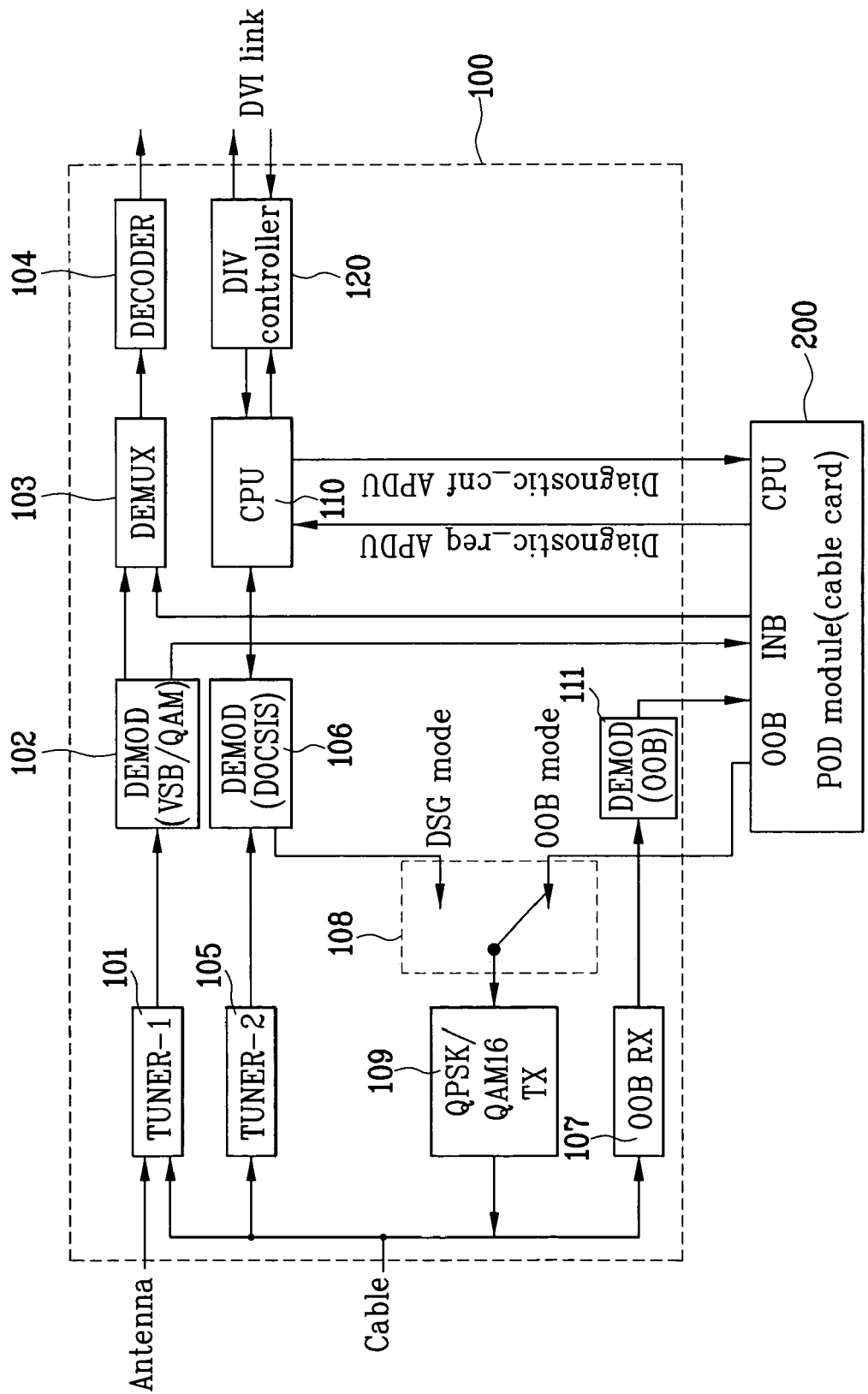
FIG. 6 illustrates an example of a digital cable TV receiver according to the present invention.

FIG. 6 illustrates an example of a digital cable TV receiver according to the present invention. The digital cable TV receiver broadly includes a host 100, and a POD module 200 that can be mounted to or dismounted (or separated) from a slot of the host 100. The host 100 may either be used to receive cable broadcast programs only or be used to receive all types of broadcast programs including cable broadcast programs, terrestrial broadcast programs, and satellite broadcast programs. FIG. 6 illustrates an example of a cable digital television that can receive both cable and terrestrial broadcast programs.

In addition, there are two types of data broadcast program transmission methods, wherein data broadcast programs such as stocks information or weather forecast are transmitted. More specifically, an Out Of Band (OOB) method and a DOCSIS Set-top Gateway (DSG) method are proposed as a method for upstream services within an open cable. The data broadcast program may be viewed at the moment a viewer views the television (TV) and selects a desired program. Alternatively, the data broadcast program may be viewed when the viewer directly interacts with the broadcast program or when the viewer selects the information he or she needs.

The OOB method relates to a transmission method between intersect equipments within a cable broadcast station (head-end) and a Set-Top box. The DSG method relates to a transmission method between a cable modem control system of a cable broadcast station and a DOCSIS-based cable modem within a Set-Top box. The DOCSIS standard uses cable modem to allow data to be transmitted. The example of a digital cable TV receiver using the OOB/DSG combined method is shown in FIG. 6. However, this is only one of the preferred embodiments of the present invention, and one of an OOB-only digital cable TV receiver and a DSG-only cable broadcast program may be used according to the present invention.

Figure 7:
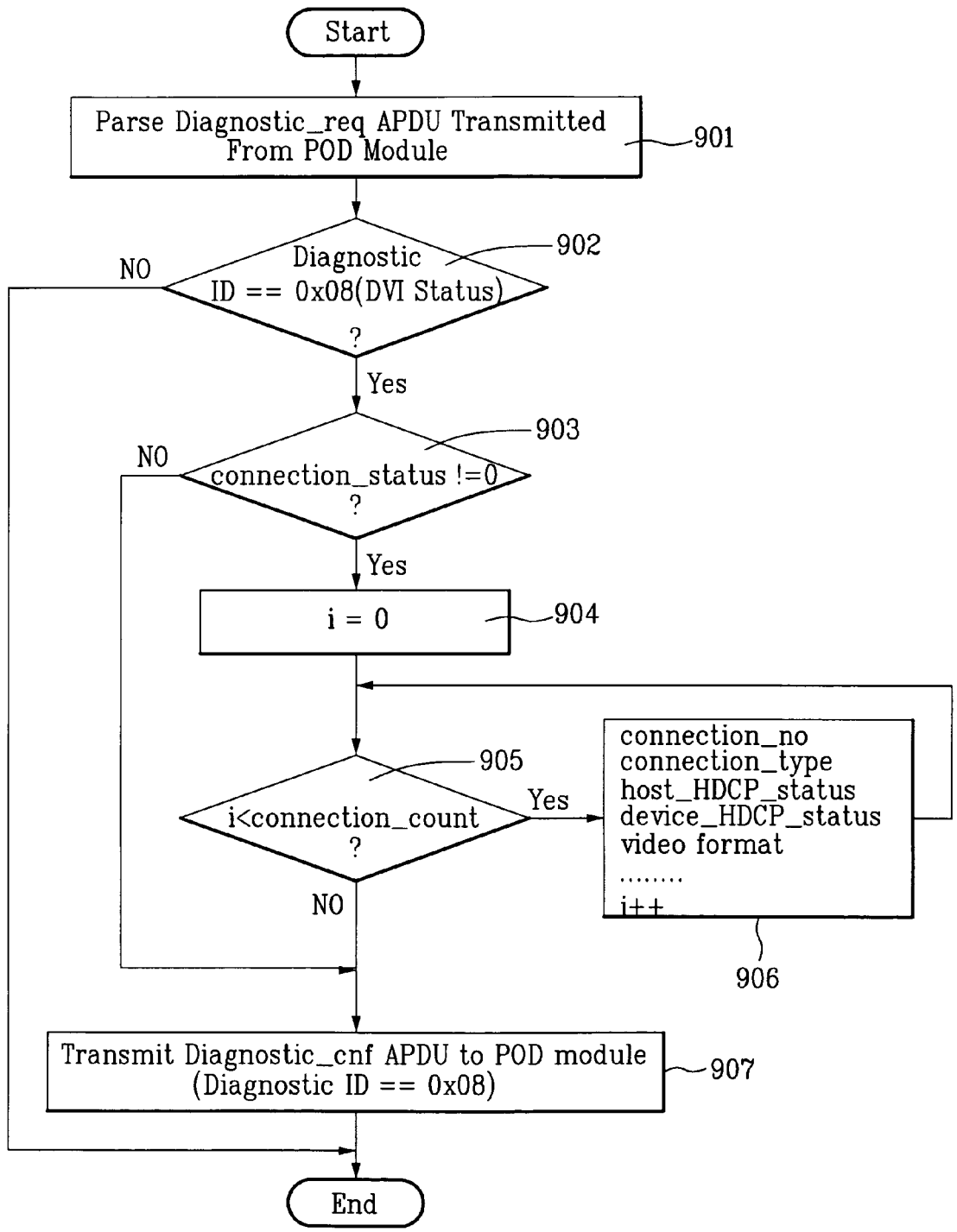
FIG. 7 illustrates a flow chart of process steps for creating and transmitting DVI status information according to the present invention.

FIG. 7 illustrates a flow chart of process steps for creating and transmitting DVI status information according to the present invention. Hereinafter, the operations of the present invention will now be described with reference to FIG. 4 to FIG. 7. More specifically, in the host 100, a tuner 101 tunes only a specific channel frequency from terrestrial Audio/Video (A/V) broadcasting, which is transmitted through an antenna, and cable A/V broadcasting, which is transmitted by In-band through a cable. Then, the tuned channel frequency is transmitted to a first demodulator 102. Since each of the terrestrial broadcasting and the cable broadcasting has a different transmission method, each of the decoding methods within the first demodulator 102 is also different from one another. In other words, the terrestrial A/V broadcasting is demodulated to a Vestigial Sideband (VSB) Modulation method and transmitted accordingly, and the cable A/V broadcasting is demodulated to a Quadrature Amplitude Modulation (QAM) method and transmitted accordingly. Therefore, when the channel frequency tuned from the tuner 101 is a terrestrial broadcast channel frequency, the tuned channel frequency is demodulated to a VSB method from the first demodulator 102. Alternatively, when the channel frequency tuned from the tuner 101 is a cable broadcast channel frequency, the tuned channel frequency is demodulated to a QAM method from the first demodulator 102.

In case of the terrestrial broadcasting, the demodulated signal transmitted from the first demodulator 102 is transmitted to a demultiplexer 103. And, in case of the cable broadcasting, the demodulated signal is transmitted to the demultiplexer 103 through the POD module 200 mounted on the slot. The POD module 200 includes a Conditional Access (CA) system for preventing high value-added broadcast contents from being copied and for providing restricted access. The POD module 200 is also referred to as a cable card. When a scramble occurs in the cable A/V broadcasting, the POD module descrambles the cable A/V broadcasting, which is then transmitted to the demultiplexer 103. When the POD module 200 is not inserted in the slot, the cable A/V broadcasting demodulated from the first demodulator 102 is directly transmitted to the demultiplexer 103. In this case, the scrambled cable A/V broadcasting cannot be descrambled, and therefore the viewers are unable to view the broadcast program normally.

The demultiplexer 103 receives the multiplexed signal and separates the multiplexed signal to a video signal and an audio signal. Thereafter, the demultiplexer 103 transmits the separated signals to a decoder 104. The decoder 104 recovers the compressed A/V signal to its initial state by using a video decoding algorithm and an audio decoding algorithm, respectively, and then outputs the recovered signal for display. Meanwhile, a second tuner 105 tunes a specific channel frequency among the data broadcasting transmitted through cable by the DSG method and transmits the tuned channel frequency to a second demodulator 106. The second demodulator 106 demodulates the DSG type data broadcasting, which is then transmitted to a CPU 110. Moreover, a third tuner 107 tunes a specific channel frequency among the data broadcasting transmitted through cable by the OOB method and transmits the tuned channel frequency to a third demodulator 111. The third demodulator 111 demodulates the OOB type data broadcasting by using a Quarternary Phase Shift Key (QPSK) method, which is then transmitted to the POD module 200. More specifically, since the OOB type uses the QPSK transmission method, a receiving end also uses a QPSK type modulation.

Furthermore, when a bi-directional telecommunication between the cable broadcast station and the digital cable TV receiver can be performed, the information (e.g., paid program subscription, Diagnostic information of the host, etc.) transmitted from the digital cable TV receiver to the cable broadcast station is transmitted by one of the OOB method and the DSG method. This is why a switching unit 108 is provided herein. More specifically, when the OOB type transmission is used, user information or System Diagnostic information is transmitted to a modulator 109 through the POD module 200 and the switching unit 108. Then, the information is modulated by using the QPSK method from the modulator 109, which is then transmitted to the cable broadcast station through cable. On the other hand, when using the DSG type transmission, the information is transmitted to the modulator 109 through the CPU 110 and the switching unit 108. Thereafter, the information is modulated by using a QAM-16 method from the modulator 109, which is then transmitted to the cable broadcast station through cable.

Meanwhile, the CPU 110 parses the Diagnostic_req APDU, which is transmitted from the POD module 200 (S201). The, the CPU 110 verifies whether '0x08' is included within the Diagnostic ID (S202). When the 0x08 is included, the DVI status is verified by using a DVI controller 120, and the verified result is transmitted to the POD module 200. More specifically, the DVI controller 120 first verifies whether peripheral devices are connected to the host by DVI link and also verifies the number of the connected peripheral devices, so as to set up (or determine) the connection_status field value and the connection_count field value. Subsequently, the DVI controller 120 determines whether the connection_status field value is '0' (S203). When the connection_status field value is '0', there are no peripheral devices connected to the host by DVI link. Accordingly, the process step is skipped to Step 207, thereby transmitting a Diagnostic_cnf APDU to the POD module 200, which indicates that no DVI status information is included.

In the above-described Step 203, when the connection_status field value is not '0', at least one peripheral device is connected to the host by DVI link, and so the process step proceeds to Step 204. Thereafter, a variable i is initialized to '0' so as to determine whether the value of the variable i is lower (or smaller) than the connection_count field value (S205). The variable i is a value that is compared with the connection_count field value in order to transmit all of the DVI link status information of more than one peripheral devices to the POD module. Herein, the variable i is increased by '1' each time the FOR loop is performed; Therefore, in the above-described Step 205, when the value of the variable i is lower than the connection_count field value, this indicates that there still remain DVI link status information which have not been transmitted to the POD module 200. At this point, the process proceeds to Step 206, wherein the connection_no field, the connection_type field, the host_HDCP_status field, the device_HDCP_status field, and the video format information are created. The video format information includes horizontal_lines information, vertical lines information, scan_rate information, aspect_ratio information, and prog_inter_type information. In other words, the above-described Step 204 to Step 206 correspond to the FOR loop repetition statement.

In the example shown in FIG. 2, an assumption is made that the status information of the first DVI Input port of the host is first created, and that the status information of the second DVI Input port of the host is created afterwards. In this case, the connection_count field value is set to '2'. And, since the value of the variable i is determined to be equal to '0' in Step 204, the value of the variable i is determined to be lower than the connection_count field value (i.e., 0<2) in Step 205. Accordingly, in Step 206, the connection_no field, the connection_type field, the host_HDCP_status field, the device_HDCP_status field, and the video format information corresponding to the first DVI Input port are created. Then, the value of the variable i is increased by '1', and the process proceeds to Step 205.

At this point, since the value of the variable i becomes '1', the value of the variable i is determined once again to be lower than the connection_count field value (i.e., 1<2) in Step 205. Accordingly, in Step 206, the connection_no field, the connection_type field, the host_HDCP_status field, the device_HDCP_status field, and the video format information corresponding to the second DVI Input port are created. Then, the value of the variable i is increased once again by '1', and the process proceeds to Step 205. At this point, since the value of the variable i becomes '2', the value of the variable i is determined to be not lower than the connection_count field value (i.e., 2=2) in Step 205. And so, the process proceeds to Step 207. In Step 207, the status information for all of the DVI links of the host, which is created each time the FOR loop is performed, is included in the Diagnostic_cnf APDU, which is then transmitted to the POD module 200.

As described above, the process of creating and transmitting DVI status information may either be performed by using hardware or performed by using middleware or software. Also, the DVI controller 120 may either be included in the CPU 110 or formed externally, as shown in FIG. 6. Additionally, the present invention may be applied to all types of television receivers and Set-Top boxes supporting cable broadcast programs. Most particularly, the present invention can be applied to all types of digital cable TV receivers adopting the open cable standard. Meanwhile, preferred embodiments have been proposed in the description of the present invention. Therefore, when considering the technical difficulty of the present invention, those skilled in the art are fully capable of modifying the present invention so as to propose other embodiments of the present invention. Evidently, it will be apparent that such modifications do not depart from the scope and spirit of the present invention.

As described above, in the digital cable TV receiver, the diagnostic method for the digital cable TV receiver, and the data structure of a DVI status report according to the present invention, when a POD module requests a host to perform diagnostics of a DVI status and transmit the results back to the POD module, and when a plurality of peripheral devices are connected to the host by DVI link, the host verifies the status of all DVI links, creates the corresponding DVI status information, and transmits all information to the POD module. Thus, the present invention is capable of resolving the problems lying in the related art, wherein status information for only a single DVI link can be transmitted to the POD module, even when a plurality of devices are connected to the host.

In addition, the present invention expands a Diagnostic Status Report Syntax within a Generic Diagnostic Protocol, so as to create the status information for all of the DVI links for the connections within the host and to transmit the status information to the POD module, thereby facilitating the expansion and providing compatibility of the Diagnostic Status Report Syntax, so that it can be applied to all types of digital cable TV receivers. Furthermore, by adding information on whether the corresponding DVI port formed in the host is a DVI Input port, a DVI Output port or a DVI Input/Output port in each DVI link, which creates the status information, the DVI status information can be transmitted with more accuracy.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A digital cable television (TV) receiver, comprising:
   a Point of Deployment (POD) module; and
   a host device comprising a controller and a plurality of digital visual interface (DVI) ports linked to a plurality of peripheral devices, respectively,
   wherein the controller generates DVI status information associated with the plurality of the DVI ports in response to a single diagnostic request and transmits the DVI status information to the POD module through a central processing unit (CPU) interface in response to the single diagnostic request for a DVI status, when the single diagnostic request is received from the POD module through the CPU interface,
   wherein the CPU interface enables the DVI status information to be transferred between a CPU of the host device and a CPU of POD module, and
   wherein the DVI status information includes a connection status indicating whether or not a connection exists on each of the DVI ports, and the DVI status information is generated in such a manner that DVI status information for the plurality of the DVI ports is collected by repetitive diagnostics.

2. The digital cable TV receiver of claim 1, wherein the DVI status information comprises a connection type field identifying a DVI port linked to a peripheral device as any one of a DVI input port, a DVI output port, and a DVI input/output port.

3. The digital cable TV receiver of claim 1, wherein the DVI status information comprises a connection number field indicating an index number of a DVI port linked to a peripheral device.

4. The digital cable TV receiver of claim 1, wherein the DVI status information comprises a host HDCP status field indicating whether high-bandwidth digital content protection (HDCP) is enabled on a corresponding DVI link and a device HDCP status field indicating a HDCP status of a peripheral device connected to the DVI link.

5. The digital cable TV receiver of claim 1, wherein each DVI status information comprises video format information indicating a current video format utilized on a DVI port connected to a peripheral device.

6. The digital cable TV receiver of claim 5, wherein the video format information indicates at least one of a number of horizontal lines, a number of vertical lines, a scan rate, an aspect ratio, and a scanning type associated with the current video format.

7. The digital cable TV receiver of claim 1, wherein the DVI status information further comprises a connection count field indicating a number of the plurality of DVI ports linked to the plurality of peripheral devices.

8. A diagnostic method for a digital cable television (TV) receiver having a plurality of digital visual interface (DVI) ports, the method comprising:
   receiving, by a controller of a host device, a single diagnostic request for a DVI status through a central processing unit (CPU) interface from a Point of Deployment (POD)-module; and
   performing, by the controller of the host device, a diagnostic function in response to the diagnostic request and generating DVI status information associated with the plurality of the DVI ports in response to the single diagnostic request and transmitting the DVI status information to the POD module through the CPU interface,
   wherein the CPU interface enables the DVI status information to be transferred between a CPU of the host device and a CPU of POD module, and
   wherein the DVI status information includes a connection status indicating whether or not a connection exists on each of the DVI ports, and the DVI status information is generated in such a manner that DVI status information for the plurality of the DVI ports is collected by repetitive diagnostics.

9. The diagnostic method of claim 8, wherein the DVI status information further comprises a connection count field indicating a number of the plurality of DVI ports linked to the plurality of peripheral devices, respectively.

10. The diagnostic method of claim 8, wherein the DVI status information comprises a connection type field identifying a DVI port linked to a peripheral device as one of a DVI input port, a DVI output port, and a DVI input/output port.

11. The diagnostic method of claim 8, wherein the DVI status information comprises a connection number field indicating an index number of a DVI port linked to a peripheral device.

12. The diagnostic method of claim 8, wherein the DVI status information comprises a host HDCP status field indicating whether high-bandwidth digital content protection (HDCP) is enabled on a corresponding DVI link and a device HDCP status field indicating a HDCP status of a peripheral device connected to the DVI link.

13. The diagnostic method of claim 8, wherein the DVI status information comprises video format information indicating a current video format utilized on a DVI port linked to a peripheral device.

14. The diagnostic method of claim 13, wherein the video format information indicates at least one of a number of horizontal lines, a number of vertical lines, a scan rate, an aspect ratio, and a scanning type associated with the current video format.

* * * * *